United States Patent
Hoashi et al.

(10) Patent No.: US 7,930,281 B2
(45) Date of Patent: Apr. 19, 2011

(54) METHOD, APPARATUS AND COMPUTER PROGRAM FOR INFORMATION RETRIEVAL

(75) Inventors: Keiichiro Hoashi, Saitama (JP); Hiromi Ishizaki, Saitama (JP); Fumiaki Sugaya, Saitama (JP)

(73) Assignee: KDDI Corporation, Tokyo (JP)

( * ) Notice: Subject to any disclaimer, the term of this patent is extended or adjusted under 35 U.S.C. 154(b) by 540 days.

(21) Appl. No.: 11/969,477

(22) Filed: Jan. 4, 2008

(65) Prior Publication Data

US 2008/0168059 A1 Jul. 10, 2008

(30) Foreign Application Priority Data

Jan. 5, 2007 (JP) ................ P2007-000571

(51) Int. Cl.
*G06F 17/00* (2006.01)
(52) U.S. Cl. ...................................... 707/705
(58) Field of Classification Search .............. 707/705, 707/999.1, 999.003
See application file for complete search history.

(56) References Cited

U.S. PATENT DOCUMENTS

2006/0112098 A1* 5/2006 Renshaw et al. ............ 707/7
2009/0043811 A1* 2/2009 Yamamoto et al. ........ 707/104.1

FOREIGN PATENT DOCUMENTS

| JP | 2003316818 A | 11/2003 |
|----|--------------|---------|
| JP | 2006243887 A | 9/2006 |

OTHER PUBLICATIONS

Hoashi, K. et al.; "Feature Space Modification for Content-Based Music Retrieval Based on User Preferences"; Proc of ICASSP 2006, vol. V, pp. 517-520.
Hoashi, K. et al.; "Personalization of User Profiles for Content-based Music Retrieval Based on Relevance Feedback"; Proc of ACM Multimedia 2003, pp. 110-119, 2003.

* cited by examiner

*Primary Examiner* — Charles Rones
*Assistant Examiner* — Belix M Ortiz
(74) *Attorney, Agent, or Firm* — Westerman, Hattori, Daniels & Adrian, LLP

(57) ABSTRACT

A query building module 6 includes a query DB 61 for managing a query vector of a piece of music, which matches a user preference, a similarity calculating unit 62 for calculating a similarity between the query vectors, which are registered in the query DB 61, a query vector integrating unit 63 for integrating a plurality of query vectors similar to each other into one piece of preference information, and a query updating unit 64 for newly registering the integrated new query vector to the query DB 61 and deleting the integrated two similar query vectors from the query DB 61, thereby updating the query DB 61, and builds a query Q in which all of the query vectors having high similarity are integrated and is an aggregation of the query vectors not similar to each other.

9 Claims, 5 Drawing Sheets

METHOD, APPARATUS AND COMPUTER PROGRAM FOR INFORMATION RETRIEVAL

BACKGROUND OF THE INVENTION

1. Field of the Invention

The present invention relates to a method, an apparatus and a program for information retrieval for retrieving information, which matches a user preference, from many pieces of information, and specifically relates to the method, the apparatus and the program for information retrieval realizing correct information retrieval in a short time by applying a clustering method.

2. Description of the Related Art

A technique for music retrieval based on a user preference is disclosed in the patent document 1 and the non-patent document 1. Herein, an acoustic feature of music is analyzed based on the music and preference information (sample of preferred music) input by a user as a query, and the music, which matches the user preference, is retrieved and is presented to the user. Also, by utilizing matching feedback information from the user, retrieval accuracy is improved.

As an improvement of the above-described technique, in the patent document 2 and the non-patent document 2, a method of improving the retrieval accuracy by clustering retrieval target music and rebuilding a feature space by utilizing the clustering result is disclosed.

[Patent Document 1] Japanese Patent Application Laid-Open No. 2003-316818

[Patent Document 2] Japanese Patent Application Laid-Open No. 2006-243887

[Non-Patent Document 1] K. Hoashi et al.: Personalization of user profiles for content-based music retrieval based on user preferences, Proc of ACM Multimedia 2003, pp. 110-119, 2003.

[Non-Patent Document 2] K. Hoashi et al.: Feature space modification method for content-based music retrieval based on user preferences, Proc of ICASSP 2006, Vol. V, pp. 517-520, 2006.

In all of the above-described conventional arts, all of the pieces of the retrieval target music are compared with the query and it is judged whether the result thereof matches the user preference based on a similarity thereof, so that the larger the number of pieces of the retrieval target music is, the longer a processing time of the information retrieval is. Then, when the number of pieces of the retrieval target music is enormous, it could be difficult to build a practicable system.

In the above-described conventional art, although it is assumed that the sample of a plurality of pieces of music to which the user prefers is input as the query, when the acoustic feature of the music included in the query is significantly different, it could be highly possible that this negatively affects the accuracy of the retrieval.

For example, in a case in which a piece of quiet music and a piece of lively music are input as the preference information, since the query is generated by summing feature vectors of both pieces of music in the above-described conventional art, the query has an intermediate feature of the both pieces of music and has the feature of the music not quiet and not lively. Many pieces of music retrieved based on such a query are the ones having a feature not similar to the music input by the user, and as a result, this may deteriorate the retrieval accuracy for the user.

SUMMARY OF THE INVENTION

An object of the present invention is to provide a method, an apparatus and a program for information retrieval realizing correct information retrieval in a short time by applying a clustering method.

In order to achieve the above-described object, the present invention is an information retrieval device for retrieving information, which matches a user preference, from an aggregation of retrieval target, including following means.

(1) Vectorizing means for generating a feature vector of each piece of retrieval target; clustering means for clustering each piece of retrieval target into a plurality of clusters based on the feature vector thereof; representative vector generating means for generating a representative vector of each of the clusters; preference importing means for urging the user to input the preference regarding the retrieval target and importing input preference information; query building means for building a query based on the input preference information; retrieval target narrowing means for comparing the representative vector of each of the clusters and the query and narrowing the retrieval target clusters into at least one cluster of which similarity is high; retrieval means for comparing the feature vector of retrieval target belonging to the retrieval target clusters and the query and extracting the retrieval target of which similarity is high; and retrieval result outputting means for presenting a retrieval result to the user.

(2) Query building means includes means for generating a query vector representing a feature of each piece of input preference information; means for calculating the similarity of each query vector; and means for integrating a plurality of query vectors similar to each other into one query vector, wherein an aggregation of the query vectors not similar to each other is made the query.

(3) Means for normalizing the similarity between the feature vector of each piece of retrieval target belonging to the retrieval target clusters and the query, based on retrieval target distribution in each retrieval target cluster, is provided, wherein the retrieval means extracts retrieval target of which similarity is high from the normalized similarity.

According to the present invention, the following effect is achieved.

(1) Since the retrieval target clusters of the music are narrowed in advance for each query vector, a high-speed retrieval becomes possible.

(2) In the query, the query vectors between which the similarity is high, are integrated in advance, so that the query is an aggregation of the query vectors not similar to each other, and the similarity with each piece of music is calculated for each query vector. Therefore, even if the query includes both quiet music and lively music, the music similar to each of them are independently retrieved, so that the music retrieval correctly reflecting the user preference becomes possible.

(3) The similarity between the music cluster and the query vector is normalized based on the music distribution in the music cluster, so that the correct similarity calculation becomes possible even if the music distribution in each music cluster is not uniform and is biased.

DETAILED DESCRIPTION OF THE PREFERRED EMBODIMENTS

Figure 1:
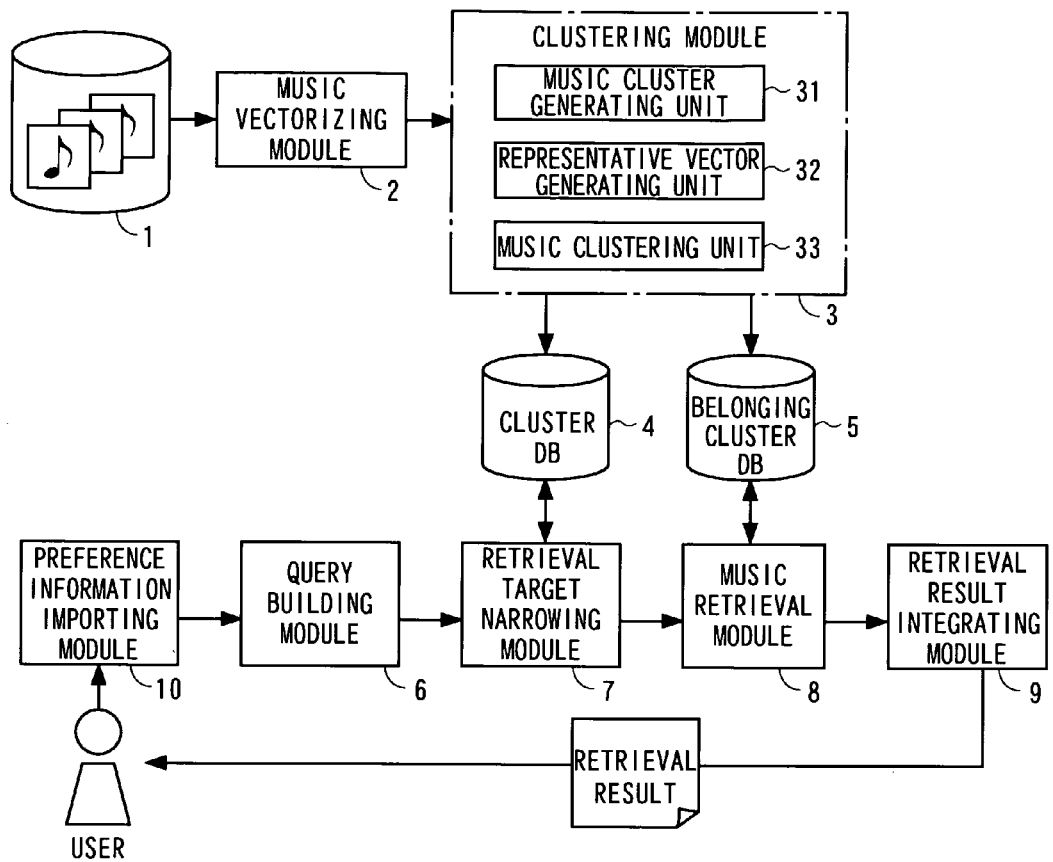
FIG. 1 is a functional block diagram of a music retrieval system applying an information retrieval device of the present invention.

FIG. 1 is a functional block diagram showing a configuration of a substantial part of a music retrieval system applying an information retrieval system of the present invention; when a user specifies his/her favorite piece of music, a piece of music, which matches the music, is retrieved from many pieces of retrieval target music and is presented to the user.

Many pieces of music to be retrieved are registered in a music database (DB) 1. A music vectorizing module 2 extracts a feature from a sound source of the retrieval target music to generate a feature vector of each piece of music. Herein, the feature vector of each piece of music is generated by adopting a tree vector quantization method (TreeQ) disclosed in the above-mentioned patent document 2, and the like.

A clustering module 3 clusters the retrieval target music based on the feature vector of each piece of music. As a method of clustering, an existing algorithm such as a k-means clustering, for example, may be adopted. Meanwhile, in a case in which the number of pieces of retrieval target music is large, an enormous amount of processing time will be required for clustering all of the music vectors, so that it is preferred, for example, to sample a part of the pieces of retrieval target music and performing the clustering process in order to shorten the time.

The clustering module 3 of this embodiment is composed of a music cluster generating unit 31 for sampling a part of the pieces of retrieval target music and performing a clustering process to generate a plurality of music clusters; a representative vector generating unit 32 for generating a feature vector cl of each music cluster based on its center of gravity or the like and registering the feature vector in a cluster DB 4 as a representative vector of each cluster; and a music clustering unit 33 for calculating a similarity between the feature vector and the representative vector of each music cluster for all of the remaining pieces of music, deciding the music cluster of which similarity is the highest as a belonging cluster of each piece of music and registering the same to a belonging cluster DB 5. In the belonging cluster DB 5, all of the pieces of the retrieval target music are related to identifier of the belonging cluster.

A preference information importing module 10 urges the user to input his/her preference regarding the retrieval target music and imports the input preference information, to generate a query vector representing an acoustic feature thereof. The module 10 may be configured to allow the user to input a piece of music or a sample thereof, or to allow the user to preview a plurality of pieces of demonstration music classified by acoustic features and to select any of them, thereby recognizing the piece of music to which the user prefers.

A query building module 6 builds a query based on the music to which the user prefers or a sample thereof. In this embodiment, as will be described later in detail, the feature vectors of a plurality of pieces of music, which are input or specified by the user, are compared, and the feature vectors of the pieces of music of which acoustic features are similar to each other are integrated into one. As a result, a query Q is built as an aggregation of a plurality of query vectors qi of which features are not similar to each other.

A retrieval target narrowing module 7 narrows retrieval target music clusters C based on the query Q built in the module 6. Specifically, the similarity between each query vector qi composing the query Q and the representative vector cl of each music cluster is calculated and only the music cluster of which similarity is higher than a predetermined reference value becomes the retrieval target. Meanwhile, in order to avoid a case in which the music clusters C cannot be narrowed due to absence of the music cluster of which similarity is higher than the reference value, in this module 7, it is possible that the similarity between each query vector qi of the query Q and the representative vector cl of each music cluster is calculated and the music cluster of top N in similarity is made the retrieval target.

A music retrieval module 8 calculates the similarity between the feature vector and the query Q for only the music belonging to the music cluster narrowed by the module 7. Specifically, the similarity between the feature vector dk of all of the pieces of music belonging to the narrowed music cluster and each query vector qi composing the query Q is calculated and the piece of music of which similarity is high and a score thereof are output for each music cluster.

In this embodiment, cosine similarity is adopted for the calculation of each similarity, and in a case of the music retrieval module 8, a similarity Sim(qi, dk) between the query vector qi and the feature vector dk of the music is calculated based on a following equation (1).

[Equation 1]

$$Sim(qi, dk) = \frac{qi \cdot dk}{|qi||dk|} \quad (1)$$

A retrieval result integrating module 9 integrates a retrieval result obtained in the module 8 for each music cluster. The integrated retrieval result (view of the pieces of music) is presented to the user as a final retrieval result.

Figure 2:
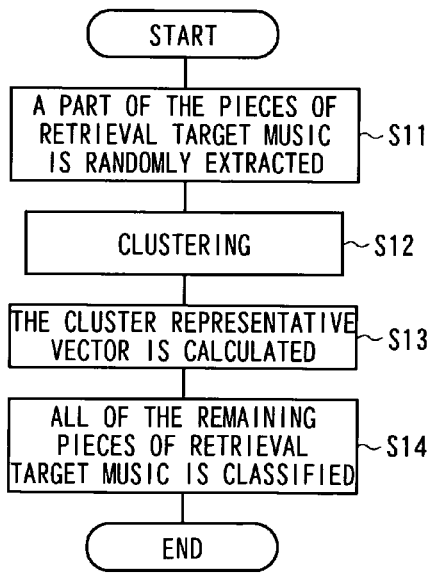
FIG. 2 is a flowchart showing a procedure of music clustering.

FIG. 2 is a flowchart showing a procedure of music clustering by the clustering module 3.

In a step S11, a part of the pieces of retrieval target music is randomly extracted from the music DB1 by the music cluster generating unit 31. For example, if there are million pieces of retrieval target music, about ten thousand pieces are randomly extracted. In a step S12, the part of extracted pieces of music are clustered based on the feature vectors thereof and a plurality of music clusters are generated. In a step S13, the cluster representative vector cl showing the acoustic feature of each music cluster is calculated as the center of gravity of the feature vector of each of the music classified into each music cluster by the representative vector generating unit 32. In a step S14, the similarity between the feature vectors of all of the remaining pieces of music not extracted, and the representative vector of each cluster is calculated by the music clustering unit 33. As a result, each piece of music is classified into any music cluster of which similarity between the vectors is the nearest.

Figure 3:
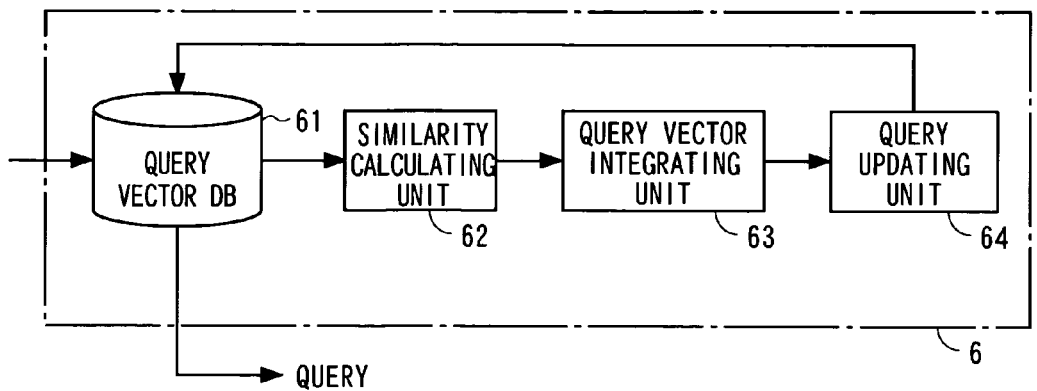
FIG. 3 is a block diagram showing a configuration of a query building module.

FIG. 3 is a block diagram showing a configuration of the module 6 including a query DB 61 for managing the query vector of the piece of music, which matches the user preference; a similarity calculating unit 62 for calculating the similarity between the query vectors registered in the query DB61; a query vector integrating unit 63 for integrating a plurality of query vectors similar to each other into one piece of preference information; and a query updating unit 64 for newly registering an integrated new query vector to the query DB 61 and deleting the integrated two similar query vectors from the query DB 61, thereby updating the query DB 61. In this embodiment, by repeating such updating, all of the query vectors of which similarity is high are integrated, and the query Q, which is an aggregation of the query vectors not similar to each other, is built.

Figure 4:
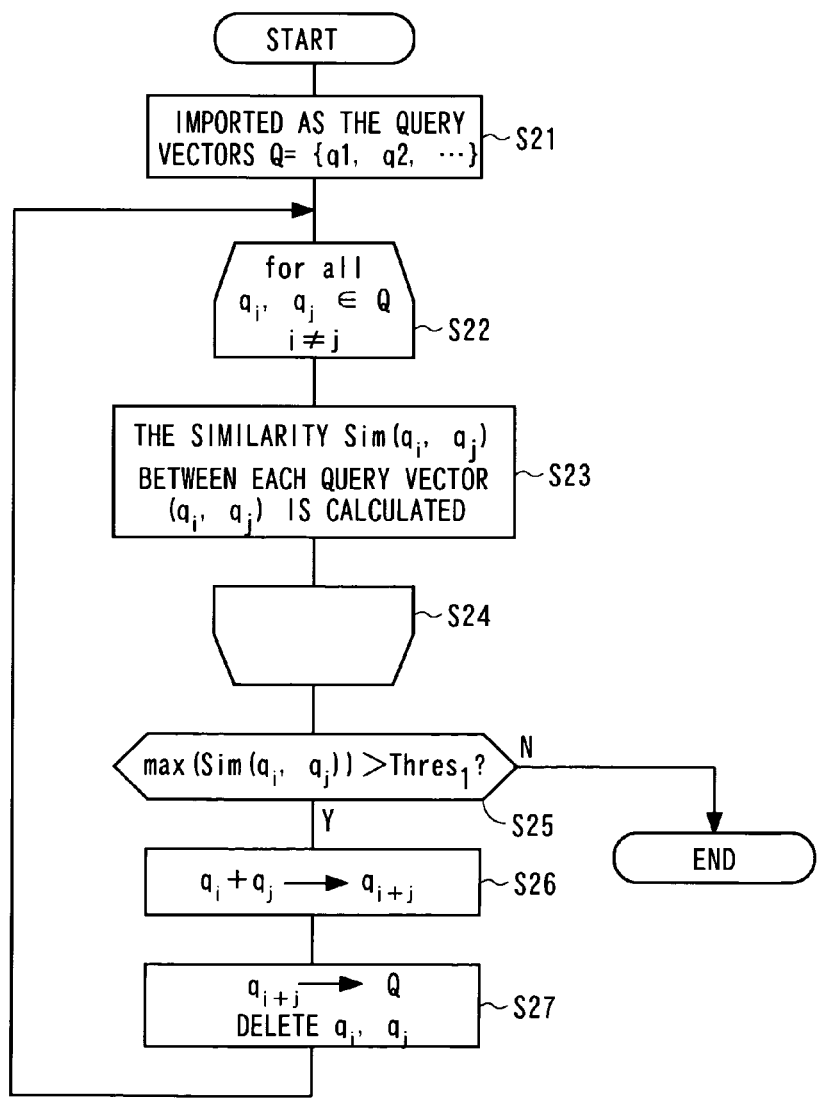
FIG. 4 is a flowchart showing a building procedure of a query.

FIG. 4 is a flowchart showing a building procedure of the query Q by the module 6. In a step S21, the feature vectors of a plurality of pieces of music, which match the user preference, are imported into the query vector DB 61 as the query vectors qi (q1, q2 . . . ). In this embodiment, the aggregation of the query vectors q is treated as the query Q. In a step S22, a pair of query vectors (qi, qj) are selected from the query Q. In a step S23, the similarity Sim(qi, qj) between each query vector (qi, qj) is calculated in the similarity calculation unit 62. In a step S24, it is judged whether the similarity calculation is completed for all of the combinations of the query vectors; if this is not completed, the procedure returns back to the step S22 and the above-described each process is repeated while changing the combination.

In this manner, when the similarity calculation is completed for all of the combinations, the procedure shifts to a step S25, and it is judged whether the maximum similarity max(Sim(qi, qj)) exceeds a predetermined reference value Thres1. If this exceeds the reference value Thres1, the procedure shifts to a step S26, and the two query vectors qi and qj between which the similarity is the highest, are integrated into one query vector qi+j in the query vector integrating unit 63. In a step S27, the integrated query vector qi+j is added to the query Q and the two query vectors qi and qj before integrating are deleted from the query Q by the query updating unit 64.

In this embodiment, in the step S25, the above-described each process is repeated until even the maximum similarity max(Sim(qi, j)) does not exceed the reference value Thres1, and by integrating all of the query vectors between which the similarity is high, the query Q, which is the aggregation of the query vectors not similar to each other, is finally built.

Figure 5:
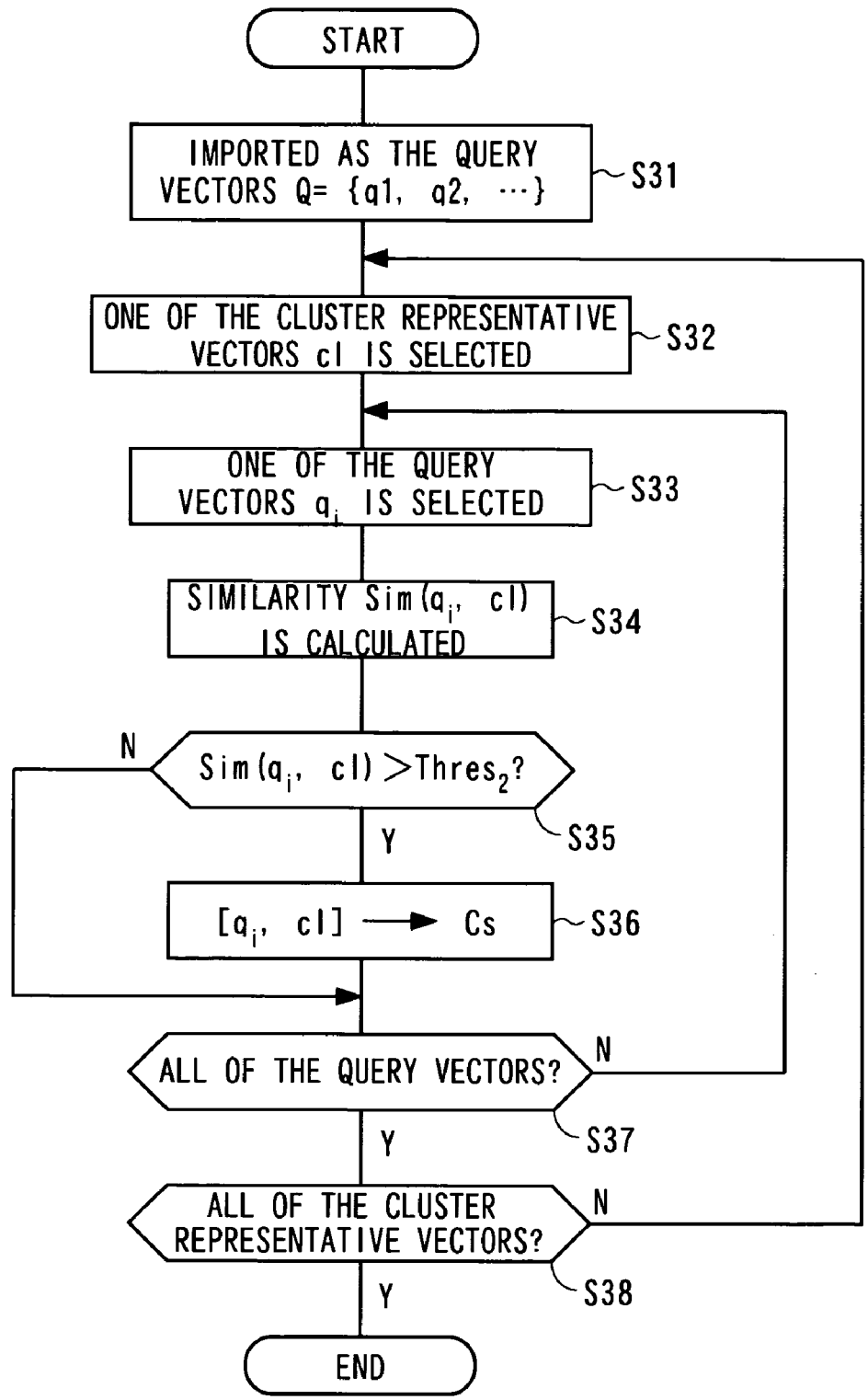
FIG. 5 is a flowchart showing a narrowing procedure of retrieval target clusters.

FIG. 5 is a flowchart showing a narrowing procedure of the retrieval target clusters by the module 7. In this embodiment, for each query vector qi composing the query Q, the similarity with the representative vector cl of each music cluster is calculated. Then, by relating a pair of the query vector and the music cluster having high similarity in advance and defining the same as the retrieval target when retrieving the pieces of music to be described hereinafter, the retrieval target music clusters are narrowed.

Meanwhile, the number of the music clusters to be related to each query vector is not necessarily one, and when one query vector is similar to a plurality of music clusters, one query vector could be related to a plurality of music clusters. On the other hand, when one music cluster is similar to a plurality of query vectors, the plurality of query vectors could be related to one music cluster.

In FIG. 5, in a step S31, the query Q is imported. In a step S32, one of the cluster representative vectors cl, which represents the feature of each music cluster, is selected. In a step S33, one of the query vectors qi is selected.

In a step S34, the similarity Sim(qi, cl) between the selected cluster representative vector cl and the query vector qi is calculated. In a step S35, the similarity Sim(qi, cl) is compared with a predetermined reference value Thres2, and when it is judged that the similarity Sim(qi, cl) exceeds the reference value Thres2 and the similarity between this cluster representative vector cl and the query vector qi is high, this cluster representative vector cl is related to this query vector qi in a step S36 and is registered in a retrieval target cluster aggregation Cs.

In a step S37, it is judged whether the process is completed for all of the query vectors qi; if this is not completed, the procedure returns back to the step S33 and above-described each process is repeated while shifting the query vectors qi.

After that, when the above-described process is completed for all of the query vectors qi of the query Q, the procedure shifts to a step S38. In the step S38, it is judged whether the process is completed for all of the cluster representative vectors cl. If this is not completed, the procedure returns back to the step S32, and above-described each process is repeated while shifting the cluster representative vectors cl. When all of the above-described procedures are completed, the retrieval target cluster aggregation Cs in which only the music clusters of which similarity with the query Q is high are registered is achieved.

Figure 6:
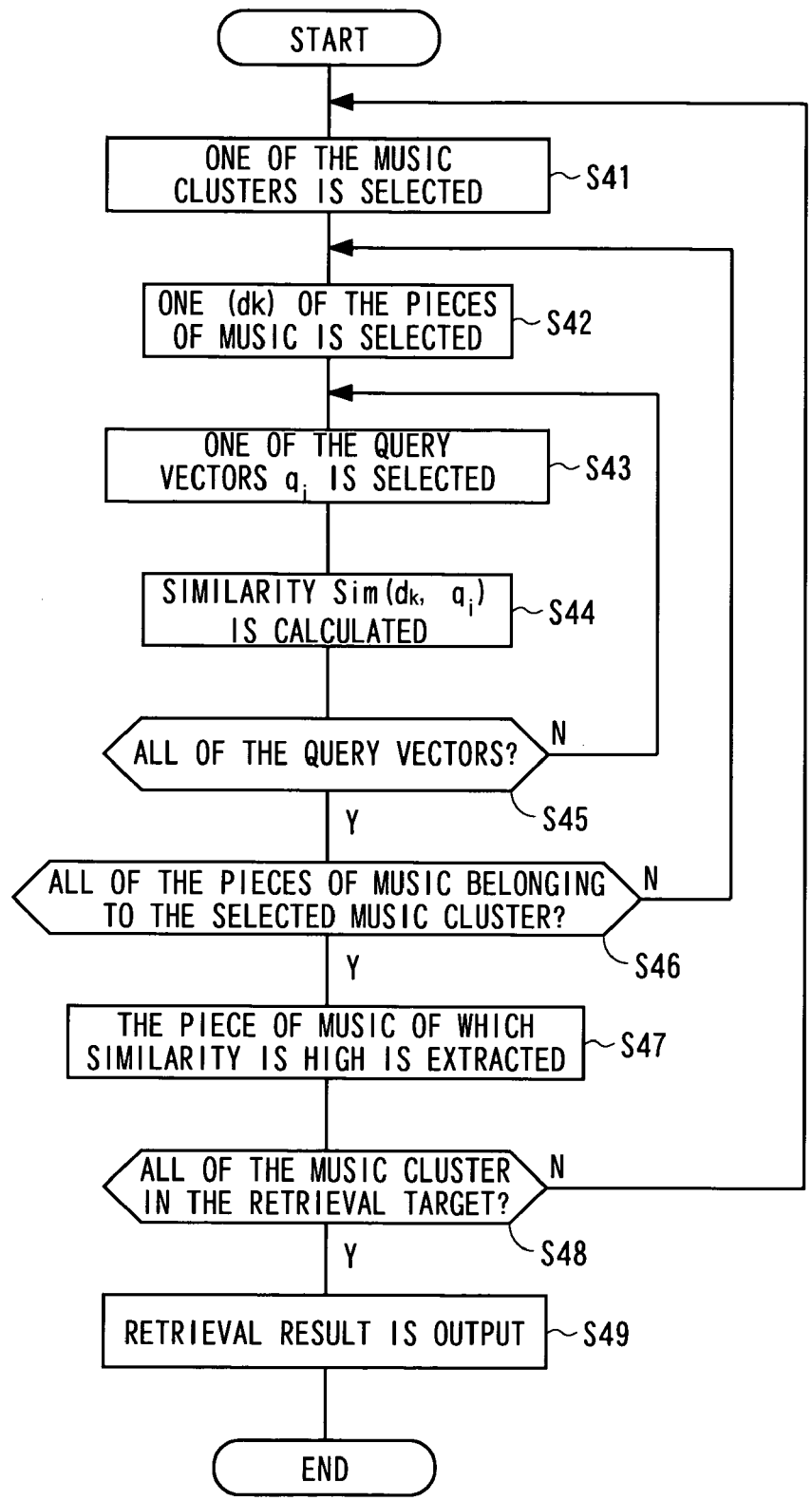
FIG. 6 is a flowchart showing a music retrieval procedure.

FIG. 6 is a flowchart showing a music retrieval procedure by the module 8, and in this embodiment, the similarity is calculated only for the pieces of music, which belong to the music clusters related as the retrieval target, for each query vector qi composing the query Q.

In a step S41, one of the music clusters is selected from the retrieval target cluster aggregation Cs. In a step S42, one (di) of the pieces of music, which belongs to the selected music cluster, is selected. In a step S43, one of the query vectors qi related to this music cluster is selected.

In a step S44, the similarity Sim(dk, qi) between the feature vector (dk) of the piece of music selected in the step S42 and the query vector (qi) selected in the step S43 is calculated. In a step S45, it is judged whether similarity calculation is completed for all of the query vectors qi related to this music cluster. If the calculation is not completed, the procedure returns back to the step S43 and above-described each procedure is repeated by shifting the query vectors.

After that, when the similarity calculation is completed for all of the related query vectors, the procedure shifts to a step S46, and it is judged whether the similarity calculation is completed for all of the pieces of music belonging to the selected music cluster. If the calculation is not completed, the procedure returns back to the step S42 and above-described each procedure is repeated while shifting the pieces of music.

After that, when the similarity calculation is completed for the feature vectors of all pieces of the music in the selected music cluster, the procedure shifts to a step S47 and the piece of music of which similarity is high is extracted. In a step S48, it is judged whether the extraction of the piece of music of which similarity is high is completed for all of the music clusters in the retrieval target cluster aggregation Cs. If the extraction is not completed, the procedure returns back to the step S41 and above-described each procedure is repeated by shifting the music clusters.

After that, when the extraction of the piece of music of which similarity is high is completed for all of the music clusters in the retrieval target cluster aggregation Cs, the procedure shifts to a step S49. In the step S49, the piece of music of which similarity is high and which is extracted for each cluster, is presented to the retrieval result integrating module 9 as the retrieval result.

The module 9 sorts the retrieval result (music) extracted for each music cluster, based on the similarity between each piece of music and corresponding query, and presents a plurality of pieces of music of which similarity is high to the user as the retrieval result.

According to this embodiment, the query vectors between which the similarity is high, are integrated in advance in the query Q and this becomes the aggregation of the query vectors not similar to each other, and the similarity with each piece of music is calculated for each query vector and the piece of music of which similarity is high is output as the retrieval result. Therefore, if the query includes a piece of quiet music and a piece of lively music, the pieces of music similar to each of them, respectively, are independently retrieved, so that the music retrieval correctly reflecting the user preference becomes possible. Moreover, since the retrieval target clusters of the piece of music are narrowed in advance for each query vector, in this embodiment, a high-speed retrieval becomes possible.

Meanwhile, although it has been described that the module 9 simply integrates the retrieval results based on the similarity in the above-described embodiment, when comparing the similarities between the music cluster and the query vector, if a music distribution in each music cluster is not uniform and is biased, the retrieval result to be finally obtained may be biased.

Figure 7:
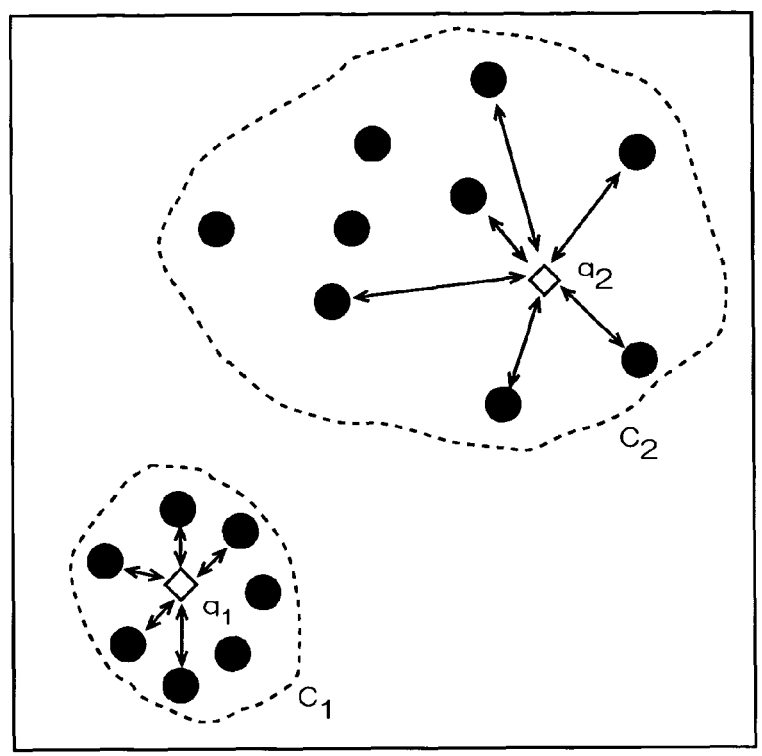
FIG. 7 is a diagram (1) schematically representing a cause why bias occurs in a retrieval result.

FIG. 7 is a diagram schematically representing a cause when bias occurs in the retrieval result, and herein, a case in which the music distribution in the music cluster C2, related to the query vector q2, is sparse, and the music distribution in the music cluster C1, related to the query vector q1, is dense, is shown.

Under such a condition, when the retrieval results by the query vectors q1 and q2 having the clusters C1 and C2 as the retrieval target clusters, respectively, are integrated, the similarity between each piece of music in the cluster C1, where the distribution of music is dense, thus the overall similarity to query vector q1 becomes higher than the similarity between each piece of music in the cluster C2 and the query vector q2, therefore, pieces of music of which is similar to the query vector q1 is mostly included in the retrieval result. As a result, pieces of music similar to the query vector q2 are hardly retrieved, and the retrieval result may not be satisfying to the user.

Figure 8:
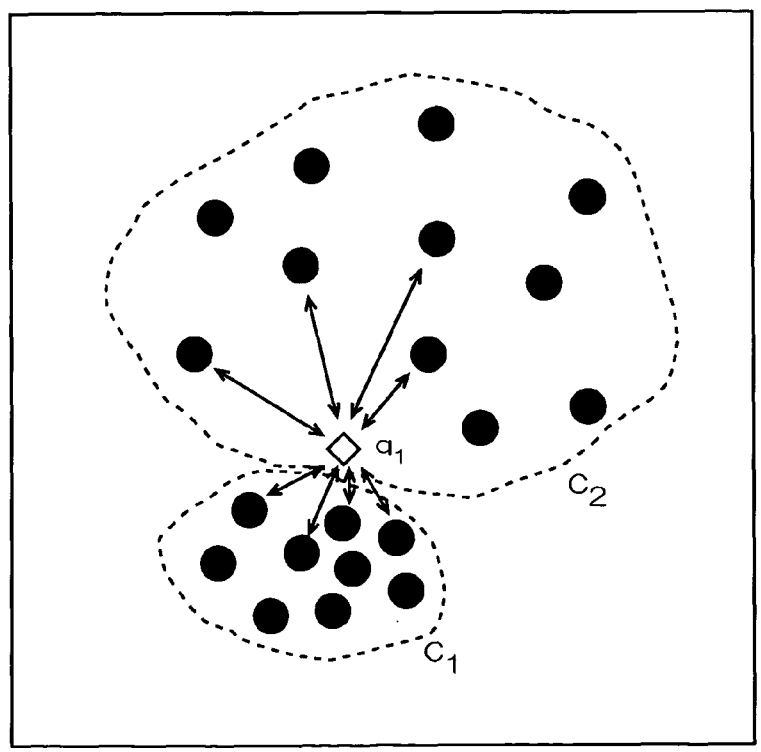
FIG. 8 is a diagram (2) schematically representing the cause why bias occurs in the retrieval result.

Similar problems could occur when one query vector q1 is related to the two music clusters C1 and C2, and the music distribution density in the music cluster C2 is sparse and the music distribution density in the music cluster C1 is thick, as shown in FIG. 8.

In such a case, each similarity may be normalized in advance based on a following equation (2), for example, such that the similarity between the piece of music in each music cluster and the query vector is normalized based on the music distribution in each retrieval target cluster in the module 9.

[Equation 2]

$$Sim'(qi, dk) = Sim(qi, dk) \cdot \left(1 + \alpha \cdot \frac{Sim(qi, cl) - AvgSim(qi, dk)}{AvgSim(qi, dk)}\right) \quad (2)$$

wherein:
Sim' (qi, dk) represents the similarity between qi and dk (after normalization),
Sim(qi, dk) represents the similarity between qi and dk (before normalization),
Sim(qi, cl) represents the similarity between qi and the center of gravity of the cluster representation cl to which dk belongs (before normalization),
AvgSim(qi, Ds) represents the average similarity between qi and all Ds belonging to the cluster (before normalization), and α represents a weighting coefficient.

The above-described normalization method has an effect to improve the score of the piece of music, which belongs to the cluster of which distribution is sparse, that is to say, the cluster of which AvgSim(qi, Ds) is expected to be low. By integrating the retrieval results after the normalization process, it becomes possible to reduce the bias of the pieces of music included in the integrated retrieval result.

Meanwhile, the music retrieval system in above-described FIG. 1 may be realized by registering the procedure executed by each of the modules 2, 3, 6, 7, 8, 9 and 10 in a computer readable recording media as a program, and allowing a computer system to read the program registered in the recording media and to execute. Herein, the computer system includes an operation system and hardware such as peripheral devices.

Meanwhile, the above-described program may be the one for realizing apart of the function of the above-described each module, or may be the one realized by combining the function of each module with the program already registered in the computer system.

What is claimed is:

1. An information retrieval device for retrieving information matching a user preference from an aggregation of retrieval target, comprising:
   vectorizing means for generating a feature vector of each piece of the retrieval target;
   clustering means for clustering each piece of the retrieval target into a plurality of clusters based on the feature vector thereof;
   representative vector generating means for generating a representative vector of each of said clusters;
   preference importing means for urging the user to input the preference regarding the retrieval target and importing input preference information;
   query building means for building a query based on said input preference information;
   retrieval target narrowing means for comparing the representative vector of each of said clusters and the query, thereby narrowing the clusters to be retrieved into at least one cluster of which similarity is high;
   retrieval means for comparing the feature vector of retrieval target belonging to said retrieval target cluster and said query, thereby extracting the retrieval target of which similarity is high; and
   retrieval result outputting means for presenting a result of said retrieval to the user.

2. The information retrieval device according to claim 1, wherein said clustering means comprises:
   means for clustering a part of the retrieval target into a plurality of clusters based on the feature vector thereof, and
   means for comparing the representative vector of each cluster and the feature vector of each piece of retrieval target other than said part and deciding a belonging cluster of each piece of retrieval target other than said part.

3. The information retrieval device according to claim 1, wherein said query building means comprises:
   means for generating a query vector representing a feature of each piece of input preference information;
   means for calculating a similarity of each query vector; and
   integrating means for integrating a plurality of query vectors similar to each other into one query vector,
   wherein an aggregation of the query vectors not similar to each other becomes the query.

4. The information retrieval device according to claim 3, wherein said retrieval target narrowing means selects the retrieval target clusters for each query vector of the query, and said retrieval means retrieves retrieval target similar to each query vector of the query from the retrieval target clusters obtained by narrowing based on the each query vector.

5. The information retrieval device according to claim 1 provided with means for normalizing the similarity between the feature vector of each piece of retrieval target belonging to each retrieval target cluster and the query based on a retrieval target distribution in each retrieval target cluster, wherein said retrieval means extracts retrieval target of which similarity is high from said normalized similarity.

6. An information retrieval method for retrieving target matching a user preference from an aggregation of pieces of retrieval target, comprising the steps of:

generating a feature vector of each piece of the retrieval target;

clustering each piece of the retrieval target into a plurality of clusters based on the feature vector thereof;

generating a representative vector of each of said clusters;

urging a user to input the user preference regarding the retrieval target and importing input preference information;

building the query based on said input preference information;

comparing the representative vector of each of said clusters and the query, thereby narrowing the clusters to be retrieved into at least one cluster of which similarity is high;

comparing the feature vector of the retrieval target belonging to said retrieval target cluster and said query, thereby extracting the retrieval target of which similarity is high; and presenting a result of said retrieval to the user.

7. The information retrieval method according to claim 6, wherein said step of building the query comprises:

generating the query vector representing the feature of each piece of input preference information;

calculating the similarity of each query vector; and integrating a plurality of query vectors similar to each other into one query vector, wherein an aggregation of the query vectors not similar to each other becomes the query.

8. A non-transitory computer readable medium with a program stored thereon for causing a computer to retrieve information matching a user preference from an aggregation of retrieval target by executing the steps of:

generating a feature vector of each piece of the retrieval target;

clustering each piece of the retrieval target into a plurality of clusters based on the feature vector thereof;

generating a representative vector of each of said clusters;

urging a user to input the user preference regarding the retrieval target and importing input preference information;

building a query based on said input preference information;

comparing the representative vector of each of said clusters and the query, thereby narrowing the clusters to be retrieved into at least one cluster of which similarity is high;

comparing the representative vector of retrieval target belonging to said retrieval target cluster and said query, thereby extracting the retrieval target of which similarity is high; and presenting a result of said retrieval to the user.

9. The computer readable medium according to claim 8, wherein said step of building the query comprises:

generating the query vector representing a feature of each piece of input preference information;

calculating the similarity of each query vector; and integrating a plurality of query vectors similar to each other into one query vector, wherein an aggregation of the query vectors not similar to each other becomes the query.

* * * * *